S. W. FISK,

Assignor to FISK, CLARK & FLAGG.

Supporting and Adjusting Device for Suspender-Straps.

No. 8,912. Reissued Sept. 30, 1879.

Witnesses:

James E. Kearney

Robert Hiseman

Inventor:

Stephen Wilbur Fisk

By his Attorney,

David A. Burr

N. PETERS, PHOTO-LITHOGRAPHER, WASHINGTON, D. C.

UNITED STATES PATENT OFFICE.

STEPHEN WILBUR FISK, OF NEW YORK, N. Y., ASSIGNOR TO FISK, CLARK & FLAGG.

IMPROVEMENT IN SUPPORTING AND ADJUSTING DEVICES FOR SUSPENDER-STRAPS.

Specification forming part of Letters Patent No. 161,111, dated March 23, 1875; Reissue No. 8,912, dated September 30, 1879; application filed August 19, 1879.

*To all whom it may concern:*

Be it known that I, STEPHEN WILBUR FISK, of the city, county, and State of New York, have invented a new and useful Supporting and Adjusting Device for Suspender-Straps; and that the following is a full, clear, and exact description of the same.

This invention relates to the device by means of which the suspender-straps are connected and attached to the shoulder-straps on a pair of suspenders.

The object of my said invention is to enable the suspender-straps to adjust themselves readily to the peculiarities of the pantaloons of the wearer; and to this end it consists in the combination, with the straps of suspenders, or with the buckles or other devices employed for their adjustment in length, of an inflexible longitudinally-curved segmental loop or tab of metal or other rigid material to receive the connecting-strap of the suspender-ends, and in and through which the said strap may slide to and fro freely and without injury.

Figure 1:
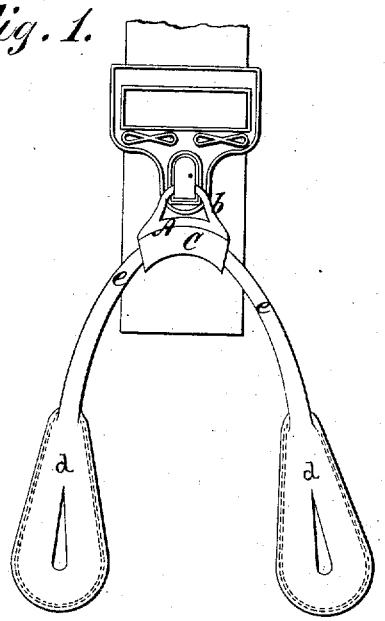
Figure 2:
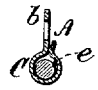
Figure 3:
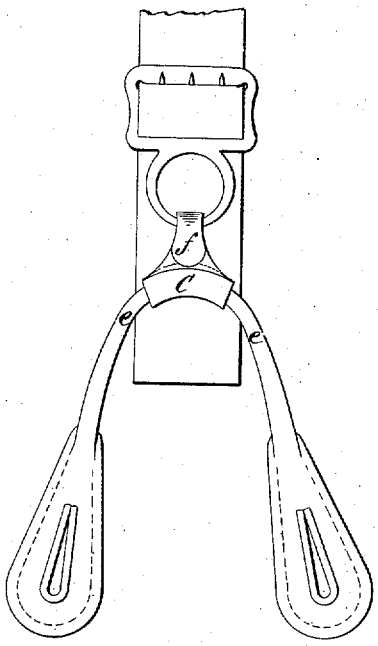

In the accompanying drawings, Figure 1 represents a face or front view of my improved inflexible segmental loop attached to the buckle of one of the shoulder-straps of a pair of suspenders with the suspender-straps supported by the loop. Fig. 2 represents a transverse section of the segmental loop and strap illustrated in Fig. 1. Fig. 3 is a face view, illustrating another mode of attaching the segmental loop to the suspender-buckle.

In constructing my improved device, I form in connection with, or affix permanently to, a plate, A, a loop, *c*, of brass or other inflexible material, of sufficient diameter to permit the strap *e* of the front suspender-ends *d d* to slide and play freely back and forth therein, and which is curved longitudinally to describe an arc, as represented in Figs. 1 and 3 of the drawings. This loop is formed either by bending or folding over the lower edge of the plate A, as shown in Fig. 2, or is otherwise permanently affixed thereto.

The segmental loop, being made of rigid material, cannot change its form to obstruct, when in use, the movement of the strap *e* therein, but presents constantly a free open passage for the same. The longitudinal curve of the loop prevents the strap from bending at a sharp angle, and its extended segmental form serves to support the strap at an easy curve in such manner as to readily permit the ends to adapt themselves to the strains thereon at the best possible advantage.

The movement of the strap to and fro through the loop maintains it in a highly-polished state, so that the strap glides freely back and forth through the loop without material wear.

If the buckle for the shoulder-strap be made with a hook, an eye, *b*, Fig. 1, is formed directly upon the plate A to engage the same, and thus complete the connection of the suspender-ends supported by its loop with the shoulder-straps; or if the buckle be made with a ring, as shown in Fig. 3, the plate A is provided with a hook, *f*, to engage the ring, and when the segmental loop is applied to connect the rear suspender-straps with the shoulder-straps it may be permanently fastened to said suspender-straps, or to the yoke formed by their juncture.

I claim as my invention—

A rigid longitudinally-curved or segmental loop for suspender-ends, in which the strap of the suspender-ends may freely slide, substantially as herein set forth.

STEPHEN WILBUR FISK.

Witnesses:

A. WHITTELSEY,

SAMUEL ROBINSON.